3,337,486
CORROSION RESISTANT POLYESTER RESIN COMPOSITIONS

Allan F. Torres, Wilmington, Del., assignor to Atlas Chemical Industries, Inc., Wilmington, Del., a corporation of Delaware
No Drawing. Filed July 12, 1962, Ser. No. 209,317
1 Claim. (Cl. 260—28.5)

This invention relates to improved corrosion resistant polyester resin compositions. In particular, the invention pertains to polyester resin compositions which contain flake graphite and thereby have improved corrosion resistance.

One of the problems involved in the corrosion protection of materials such as steel by the application of organic coatings, is the transmission of moisture through the coatings when they are exposed to aqueous solutions. This is a particularly perplexing problem for which there is still no completely satisfactory solution.

It is an object of this invention to provide polyester resin compositions having improved corrosion resistance.

Another object is to provide polyester resin compositions which may be readily applied to steel to provide corrosion resistant linings therefor.

A further object of the invention is to provide a polyester resin composition which may be readily molded into articles and cured at or near room temperature.

Other objects and purposes of this invention will be apparent to those skilled in the art in view of the description which follows.

It has been discovered that polyester resin compositions which contain flake graphite may be prepared in such a manner as to provide improved corrosion resistance over the polyester resin alone and having superior corrosion resistance over currently used organic coating compositions. The compositions of this invention are not prepared from any general purpose polyester resin, but rather are prepared from curable linear polyester resins which are particularly corrosion resistant even in the absence of a filter.

The polyester resins which are particularly useful in the compositions of this invention are prepared by esterifying, in approximately equimolar proportions, lower oxyalkylene ethers of selected alkylidene diphenols with unsaturated dicarboxylic acids. More specifically, the esterification is carried out by reacting a dihydric alcohol represented by the formula

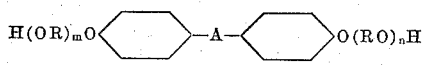

wherein A is a 2-alkylidene radical having from 3 to 4 carbon atoms, R is an alkylene radical having from 2 to 3 carbon atoms, $m$ and $n$ are each at least one and the average sum of $m$ and $n$ is not greater than 3; with an approximate equimolar quantity of unsaturated dicarboxylic acid, at least the major proportion of which is selected from the group consisting of fumaric acid, maleic acid, maleic anhydride and mixtures thereof.

Dihydric alcohols corresponding to the above formula are disclosed in U.S. Patent No. 2,331,265 which describes their preparation by reacting an alkali salt of an alkylidene diphenol and an appropriate olefin chlorhydrin. The preferred method for preparing the linear polyester resins is by the direct addition of alkylene oxide to alkylidene diphenols. In this specification, dihydric alcohols prepared by the direct addition of alkylene oxides to diphenols will be described generically as polyoxyalkylene ethers of diphenol containing an average of $(m+n)$ oxyalkylene groups per mole where $m+n$ is the total number of oxyalkylene groups per mole.

Specific dihydric alcohols which may be used to prepare the polyester resins useful in the compositions of this invention are 2,2-di(4-beta hydroxy ethoxy phenyl)-propane, 2,2-di-(4-beta hydroxy ethoxy phenyl)-butane, the polyoxyethylene ether of isopropylidene diphenol wherein both phenolic hydroxyls are oxyethylated and the average number of oxyethylene groups per mole is 2.6, and the polyoxypropylene ether of 2-butylidene diphenol wherein both phenolic hydroxyls are oxyalkylated and the average number of oxypropylene groups per mole is 2.5.

The linear polyester resins useful in this invention comprise the esterification products prepared by reacting the polyoxyalkylene ethers of a diphenol described above with substantially equimolar amounts of unsaturated dicarboxylic acids, the major proportion of which is selected from the group consisting of maleic acid, maleic anhydride and fumaric acid. Minor proportions of the esterifying dicarboxylic acid may comprise saturated carboxylic acids, aromatic carboxylic acids or other unsaturated aliphatic carboxylic acids, such as succinic acid, phthalic acid or itaconic acid. It is preferred, however, that at least 80 mole percent of the dicarboxylic acid be selected from the first named group.

The polyester resins useful in this invention may be prepared by esterification techniques well known in the art, and therefore, they will not be set forth in detail in this specification. A more detailed description of these linear polyester resins may be found in U.S. Patent No. 2,634,251.

The linear polyester resins useful in the compositions of this invention are miscible over wide ranges of concentration with styrene and other low molecular weight aromatic solvents and may be copolymerized with styrene or other vinyl monomers to yield valuable molding and coating compositions. In addition, these polyesters are readily curable in the presence of known curing catalysts to yield insoluble resins which are particularly corrosion resistant. Organic peroxides such as benzoyl peroxide are often used as curing catalysts.

The problem with which this invention is concerned is that though these linear polyester resins are useful as coatings, they are subject to attack by moisture when exposed to dilute aqueous solutions. This problem is even more acute at high temperatures, for the rate of degradation of the polyester resin increases as the temperature rises.

It has now been discovered that this problem can be overcome by incorporating flake graphite into the linear polyester resin composition. It has been found that both the amount of graphite and the size of the graphite flakes are critical to the rendering of the polyester resin compositions substantially resistant to dilute aqueous solutions.

In accordance with this invention, the graphite flakes must be of a relatively large size in order to prevent a linear polyester resin coating from blistering due to exposure to moisture. It has been found that the graphite flakes should have sufficient size to pass through a 10 mesh sieve (Tyler series) but not through a 40 mesh sieve (Tyler series). Smaller graphite flakes may also improve the resistance of the polyester resins to attack by aqueous solutions, but in general are not adequate for rendering the polyester resin substantially resistant to dilute aqueous solutions for relatively long durations.

In addition, the polyester resin compositions must contain at least about 20% by weight of flake graphite, based on the total weight of graphite, polyester and any solvent which may be present, in order to prevent corrosion of coated surfaces. It has been found that polyester resin compositions containing about 20 percent by weight of graphite flakes underwent some surface chalking when subjected to distilled water for one month at 170° F., but there was no other visible corrosion. This indicates that at least about 20 percent by weight of graphite flakes is needed to render the polyester resin composition sufficiently resistant to dilute aqueous solutions to protect the surface being coated.

Polyester resin compositions containing more than about 50% by weight of flake graphite, based on the total weight of graphite, polyester and any solvent which may be present, are very difficult to mix and process. These compositions are not readily applied as coatings and may form poor coatings. Therefore, it is generally preferred that the polyester resin compositions of this invention contain from about 20 to about 50% by weight of flake graphite based on the total weight of the composition.

As previously stated, the linear polyester resins useful in the compositions of this invention are miscible over wide ranges of concentration with styrene and other low molecular weight aromatic solvents. When a polyester resin containing flake graphite is blended with a solvent, the resulting composition is an excellent corrosion resistant coating material which is readily applied to many types of materials by a spray application, and which is especially useful in coating steel. The low molecular weight aromatic solvent may comprise up to about 50 weight percent of the polyester resin composition based on the total weight of the composition. Because of its reactivity, availability and relatively low cost, styrene is the preferred solvent.

When used as coating compositions, the polyester resin compositions of this invention are substantially resistant to dilute aqueous solutions and have excellent durability. Of course, after prolonged use, the polyester compositions may deteriorate to a certain extent, and a reapplication of the polyester resin-flake graphite coating may become necessary.

The polyester resin compositions of this invention may also be used as molding compositions. Currently, parts molded from graphite generally require high temperatures and pressures in their manufacture. The polyester resin-flake graphite compositions can be molded into parts which may be cured at room temperatures.

The following examples illustrate the polyester resin compositions of this invention and their corrosion resistant properties:

EXAMPLE I 5162 lbs. of a polyoxypropylene ether of isopropylidene diphenol containing an average of 2.2 moles of propylene oxide per mole and 1678 lbs. of fumaric acid were charged to a load tank. In addition, 1560 grams of hydroquinone (polymerization inhibitor) and 27 grams of a silicone antifoaming agent were also charged to the load tank.

The load tank was heated to about 175° C., which required 3 hours, and held at about this temperature for 4 hours. The reaction was continued under 60 mm. Hg vacuum for about 2 hours. 6211 lbs. of polyester resin was produced, which resin had an acid number of about 22.

Then the polyester resin was blended with a styrene solution on an equal parts by weight basis. The styrene contained sufficient paraffin wax dissolved therein to provide a resulting polyester resin-styrene solution containing about 0.4% by weight of paraffin wax.

EXAMPLE II

Polyester resin-styrene solutions prepared in a manner similar to the procedure described in Example I were blended with flake graphite and applied to steel panels. These coated steel panels were then tested for their resistance to corrosion by immersing them in several types of aqueous media. Two sizes of flake graphite were used. The flake graphite referred to as No. 1 passes through a 10 mesh sieve but not through a 20 mesh sieve. The flake graphite referred to as No. 2 is smaller and approximately three quarters of it will pass through a 100 mesh sieve. 33% by weight of the flake graphite, both No. 1 and No. 2, were incorporated in the polyester resin-styrene solutions. The corrosion tests were all carried out at 170° F. and after 6 months' duration yielded the following results:

| Type of Graphite in Polyester Resin | Distilled Water | 25% H$_2$SO$_4$ | 15% HCl | 5% NaOH |
|---|---|---|---|---|
| No. 1 | No degradation | No degradation | No degradation | No degradation. |
| No. 2 | Blistered after 1 month. | do | do | Do. |

These results indicate that the polyester resin-styrene solution containing the No. 1 flake graphite had excellent corrosion resistance whereas the No. 2 flake graphite was unsatisfactory in distilled water.

EXAMPLE III

Polyester resin-styrene solutions prepared in a manner similar to the procedure described in Example I were also blended with lesser amounts of flake graphite and tested for corrosion resistance. One composition contained only 10% by weight of flake graphite No. 1, but when applied to a steel panel, it was found that this composition did not contain sufficient graphite to completely cover the steel panel with graphite.

Another composition containing 20% by weight of flake graphite No. 1 did adequately cover a steel panel when applied thereto, and this panel was immersed in distilled water at 170° F. After one month, there was some slight surface chalking of the polyester resin coating but the steel panel had not been corroded.

Having completely described this invention, what is claimed is:

A polyester resin composition comprising the reaction product of a polyoxypropylene ether of isopropylidene diphenol containing an average of 2.2 moles of propylene oxide per mole of ether and fumaric acid mixed with an approximately equal amount by weight of a solution of styrene, about 0.4% by weight of polyester resin-styrene solution of paraffin wax and about 33% by weight of flake graphite of size sufficient to pass through a 10 mesh sieve but not through a 20 mesh sieve.

References Cited

UNITED STATES PATENTS

| | | | |
|---|---|---|---|
| 1,967,936 | 7/1934 | Hopkins et al. | 260—40 XR |
| 2,624,714 | 1/1953 | Bigelow | 260—40 XR |
| 2,634,251 | 4/1953 | Kass. | |
| 2,638,131 | 7/1954 | Cass | 260—40 XR |

OTHER REFERENCES

Industrial Carbon, Mantell, 2nd Edition, 1946, Van Nostrand and Co., pages 22 and 23.

Paint Manufacture, Stuart, April 1939, pages 115 and 116.

MORRIS LIEBMAN, *Primary Examiner.*

A. KOECKERT, J. FROME, *Assistant Examiners.*